Figure 1:
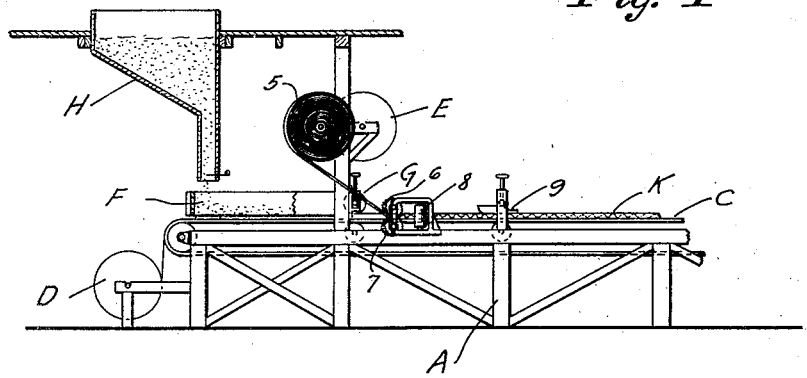

Oct. 6, 1925.

J. SCHUMACHER 1,556,164

METHOD OF FORMING PLASTER BOARD AND THE LIKE

Filed July 24, 1924   2 Sheets-Sheet 1

INVENTOR.
John Schumacher
BY Westall and Wallace
ATTORNEYS.

Oct. 6, 1925.
J. SCHUMACHER
1,556,164
METHOD OF FORMING PLASTER BOARD AND THE LIKE
Filed July 24, 1924  2 Sheets-Sheet 2
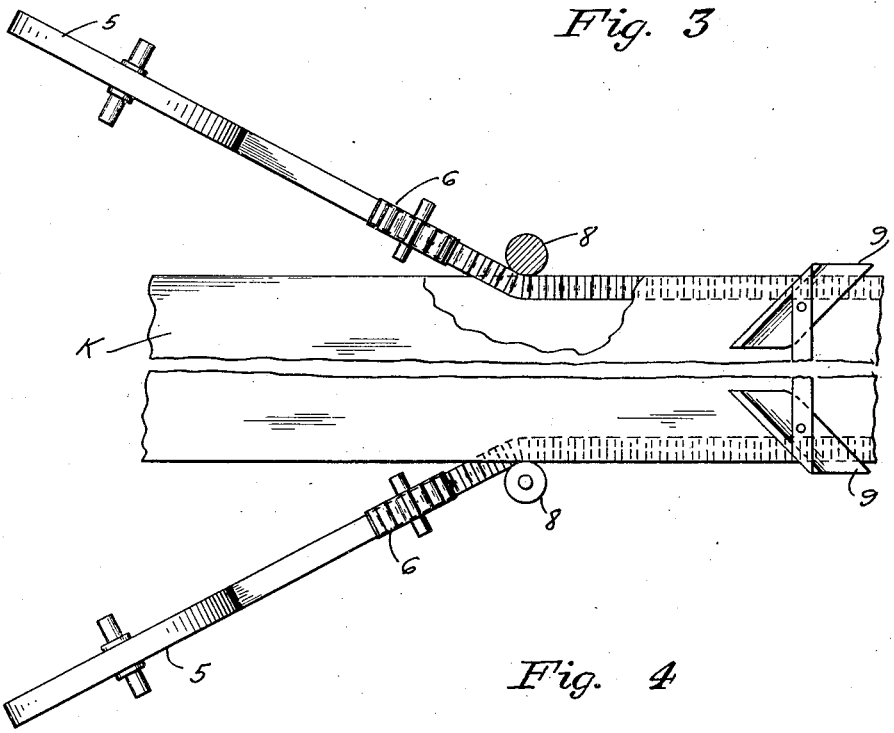
*Fig. 3*
*Fig. 4*
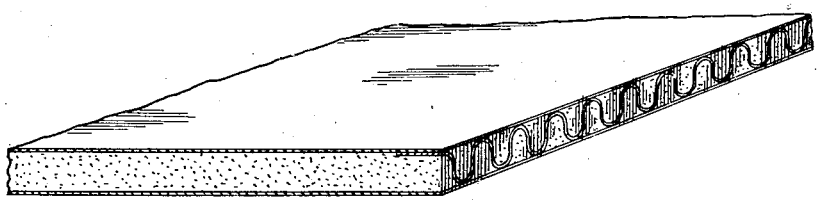
INVENTOR.
John Schumacher
BY Nestall and Wallace
ATTORNEYS.

Patented Oct. 6, 1925.

1,556,164

UNITED STATES PATENT OFFICE.

JOHN SCHUMACHER, OF LOS ANGELES, CALIFORNIA.

METHOD OF FORMING PLASTER BOARD AND THE LIKE.

Application filed July 24, 1924. Serial No. 727,868.

*To all whom it may concern:*

Be it known that I, JOHN SCHUMACHER, a citizen of the United States, and resident of Los Angeles, county of Los Angeles, State of California, have invented new and useful Improvements in Methods of Forming Plaster Board and the like, of which the following is a specification.

This invention relates to a reinforced plaster board or similar product and the method of making the same. Plaster board and the like comprising a plaster core or stratum and plaster board covering sheets of pliable sheets bound thereto, is subjected to rough usage in the manufacture, handling during transportation and installation in building structures. The edges of the board are especially susceptible to damage due to strains placed thereon, resulting in chipping, cracking, and crushing. Reinforcement of the edges is desirable to prevent injury and damage of the character above referred to. Such reinforcement should be in all directions, should not detract from the resiliency of the board, should not add to its weight, or materially change the constituent parts of the board. Furthermore, the character of reinforcement should be such as to make the board economical to manufacture. Another desirable feature is that the reinforcement should produce a unitary structure. To this end, I have provided a board having a corrugated strip of pliable material embedded therein and bound to the plastic core, the reinforcement extending along the edge. Such a board is more fully described in my application for patent for reinforced plaster board copending herewith, Serial No. 727,867, filed July 24, 1924. The primary object of the present invention is to provide an economical and simple method of continuously forming and introducing the reinforcement strip into the plaster board to produce a complete structure.

These objects together with other objects and corresponding accomplishments are obtained by means of the embodiment of my invention illustrated in the accompanying drawing, in which, for illustrative purposes, a machine is shown for carrying out the steps of the process of manufacture. However, the invention is in no manner limited to this precise machine.

Figure 2:
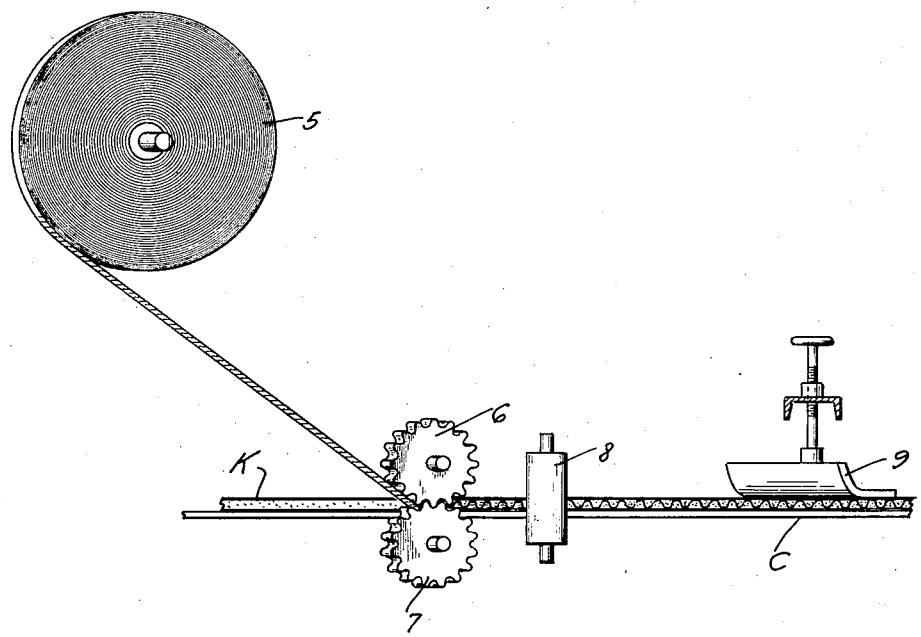

In the drawing:

Fig. 1 is a side elevation of the forming end of apparatus for making plaster board of the character described; Fig. 2 is a diagrammatic view showing essential elements of the structure; Fig. 3 is a plan view showing details of the structure of the machine shown in Fig. 1; and Fig. 4 is a perspective view showing a fragment of the board made in accordance with my invention.

Although I have shown the invention as applied to the manufacture of a plaster board, yet it is obvious that plaster lath and the like may be produced by my method of manufacture. Referring more particularly to the drawing, A indicates a frame carrying an endless conveyer belt C, upon the upper ply of which the board is formed. A supply roll of paper for the lower covering sheet is rotatably mounted upon the frame and indicated by D. A similar supply roll for the upper covering sheet is indicated by E. Plaster mud is fed between the advancing sheets from a box F, and the sheets and plaster are carried between pressure rollers G. A trough H is disposed to supply plaster to the box F. The structure just described is now well known in the art and at present is used for the manufacture of plaster board. The covering sheets are continuously advanced by the conveyer, plaster being interposed therebetween, and the finished green product is then cut into suitable lengths.

Journalled on the frame at corresponding angles to the direction of the travel of the conveyer are reinforcement strip supply rolls 5. The reinforcement strips are supplied to and introduced into the plaster board by similar mechanism on both sides. For this reason, it is sufficient to describe one set of parts upon one side of the machine. The strips on rolls 5 are of paper of the same character as the covering sheets. Each strip passes between fluting rollers 6 and 7 which produce corrugations in the strips. The fluting rollers are at the edge of the conveyer belt and plaster board indicated by K. As each reinforcement strip in corrugated condition leaves the fluting rollers 6 and 7, it travels toward the plaster board edge and is pressed thereinto by a roller 8 extending transverse to the plaster board. The introduction of the reinforcement strip in this manner may cause the board to bulge at the edges, the board being in a wet or green condition. In order to insure the board being of uniform thickness at the edges, smoothing plates 9 are provided to contact with the upper surface of the board at the edges and smooth out any irregularities therein.

It is obvious that the operation will be continuous, the reinforcement strips advancing with the board and being completely formed in a green state passing outwardly on the conveyer, where it may be severed. The steps of severing the board into lengths, stacking, drying, and trimming are performed in the manner now well known in the art.

What I claim is:

1. The method of forming reinforced plaster board and the like comprising advancing a green board having a plastic stratum and a pliable covering sheet, corrugating a strip of pliable reinforcement material, and forcing edgewise said strip into said body.

2. The method of forming reinforced plaster board and the like comprising advancing green board having a plastic stratum and a pliable covering sheet, corrugating a strip of pliable reinforcement material, advancing said strip with the advancing green board, and forcing edgewise said strip into said stratum.

3. The method of forming reinforced plaster board and the like comprising advancing pliable covering sheets, interposing therebetween a body of plastic material, and during the advance of the green board forcing a separate strip of pliable reinforcement material into said plastic body from the edge thereof.

4. The method of forming reinforced plaster board and the like comprising advancing pliable covering sheets, interposing therebetween a plastic body to form a green board, advancing a separate strip of pliable reinforcement material with the advancing green board, and forcing said strip into the plastic body from the edge thereof.

5. The method of forming reinforced plaster board and the like comprising advancing pliable covering sheets, interposing therebetween a plastic body to form a green board, corrugating a strip of pliable reinforcement material and forcing edgewise said strip into said body.

6. The method of forming reinforced plaster board and the like comprising advancing pliable covering sheets, interposing between said sheets a plastic body to form a green board, corrugating a strip of pliable reinforcement material, advancing said strip, and forcing said strip edgewise into said body.

In witness that I claim the foregoing I have hereunto subscribed my name this 15th day of July, 1924.

JOHN SCHUMACHER.